United States Patent [19]

Prochnow

[11] 4,097,144
[45] Jun. 27, 1978

[54] ADJUSTMENT DEVICE FOR PHOTOGRAPHIC ENLARGING OR REPRODUCING APPARATUS

[75] Inventor: Claus Prochnow, Brunswick, Germany

[73] Assignee: Rollei-Werke Franke & Heidecke, Brunswick, Germany

[21] Appl. No.: 742,710

[22] Filed: Nov. 17, 1976

[30] Foreign Application Priority Data

Nov. 28, 1975 Germany .............................. 2553556

[51] Int. Cl.² ...................... G03B 27/52; A47G 29/00
[52] U.S. Cl. ....................................... 355/63; 248/125
[58] Field of Search ...................... 355/21, 63, 62, 55, 355/56; 248/178, 125, 287

[56] References Cited

U.S. PATENT DOCUMENTS

| 2,298,741 | 10/1942 | Lazna | 248/125 |
|---|---|---|---|
| 2,312,562 | 3/1943 | Leonard et al. | 355/62 |
| 2,317,692 | 4/1943 | Morin | 355/62 |
| 3,148,853 | 9/1964 | Field | 248/125 |
| 3,533,583 | 10/1970 | Azim | 248/125 |

*Primary Examiner*—Donald A. Griffin
*Attorney, Agent, or Firm*—Ralf H. Siegemund

[57] ABSTRACT

A device for displacing a body along a guiding column which is particularly suitable for the projection head of an enlarging or reproducing apparatus. The device comprises in a conventional manner a guiding column and, on the body, a friction wheel which presses against the column and which is disposed on a shaft. The shaft of the friction wheel is mounted in the sleeve-like body which surrounds the column except in the vicinity of the friction wheel. The friction wheel is sub-divided into two wheel portions and means are provided for exerting a force upon the wheel portions along the axis of the friction wheel. These means act upon a guiding surface of the column disposed at an angle of up to 90° with respect to the friction wheel axis.

12 Claims, 4 Drawing Figures

ADJUSTMENT DEVICE FOR PHOTOGRAPHIC ENLARGING OR REPRODUCING APPARATUS

BACKGROUND OF THE INVENTION

This invention relates to a device for displacing a body along a guiding column and is particularly suitable as an adjustment device for the projection head of an enlarging or reproducing apparatus.

In the known adjustment apparatus for adjusting the height of the projection head at a projection table there is provided a friction wheel rotatably journalled at the projection head. The whole device is mounted on a vertically disposed guiding column which may be formed of a square bar or a rod having circular cross-section. The friction wheel is pressed against the guiding column with a high spring force. This spring force is supported by a surface of the guiding column opposite the friction wheel. In this manner considerable friction forces are created at the area between the guiding column and the body sliding along the column. This friction force can be limited by arranging ball bearings between the body and the guiding column so that an adjustment is possible with a reasonable expenditure of force.

Such adjustment devices are expensive to manufacture with the necessary high precision. During assembly the friction wheel drive must be adjusted to the guiding column.

It is accordingly an object of the present invention to provide an adjustment device of the type discussed which is much simpler in construction than prior art devices.

A further object of the present invention is to provide an adjustment device as discussed which obviates the necessity of adjustment and which can be manufactured with considerably larger tolerances without affecting its operation.

SUMMARY OF THE INVENTION

In accordance with the present invention the friction wheel is subdivided into two wheel portions. Due to a force acting along the axis of the friction wheel, the wheel portions are pressed against a guidance surface on the guiding column which forms an angle equal to or smaller than 90° with the friction wheel axis.

The forces pressing the friction wheels against the guiding column are directed almost exclusively in the direction of the friction wheel axis, and only small components of the forces press the sleeve against the guiding column. This permits elimination of an abutment for the friction wheel and a ball bearing between the abutment and the guiding column which are used in conventional devices.

At the same time the efficiency of the friction wheel drive is increased because the spring force available is almost exclusively used for generating the friction wheel pressure of the two opposing friction wheel portions.

In a preferred embodiment of the invention the guidance surfaces for the friction wheels are formed by the flanks of a longitudinal groove in the guiding column, the tapered sides of the wheel portions bearing against these flanks.

Pressure of the friction wheels against the flanks of the groove is obtained in a particularly simple manner in accordance with the invention. The wheel portions are pushed apart along their axis of rotation by a spring disposed between them. In this manner the pressure, as well as the counter pressure of the spring is utilized for pressing the friction wheels against the guiding column.

An advantageous embodiment of the invention utilizes a guiding column having a C-shape, the friction wheel extending partially into the open end of the "C" with its axis of rotation aligned between the tips of the "C". In this manner the manufacturing costs for the guiding column can be substantially reduced.

Another embodiment of the invention provides that the guiding column has a shoulder portion extending outwardly between the friction wheels. The friction wheels press against the lateral surfaces of this portion of the column. In order to generate the pressure a spring which is not axially displaceable is associated with each wheel portion, the spring bearing axially against its wheel portion.

Further in accordance with the present invention the guidance surfaces and the surfaces of the wheel portions bearing thereagainst form an acute angle with each other. As a result, the wheel portions tend under the action of the axial spring to be wedged outwardly from the guiding column. This tends to pull the C-shaped sleeve on which the wheel portions are mounted more tightly against the guiding column. Because this arrangement is self-centering, time-consuming adjustment of the tolerance in the friction wheel or in the sleeve is eliminated from the manufacturing process.

The same effect may be obtained in accordance with another variation of the invention in that the side surfaces of the wheel portions are shaped as cones or truncated cones.

A further improvement of the invention is obtained in that friction-reducing elements are attached within the sleeve between it and the surfaces of the guiding column against which it bears. These sliding elements are made of synthetic material which considerably reduces the friction between the sleeve and the guiding column, and maintains centering of the sleeve on the guiding column. In order to operate the friction wheel drive and thereby to adjust the projection head secured to the sleeve there is provided a hand wheel which is connected to the friction wheel and rotatable therewith.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings.

BRIEF DESCRIPTION OF THE PREFERRED EMBODIMENTS

Figure 1:
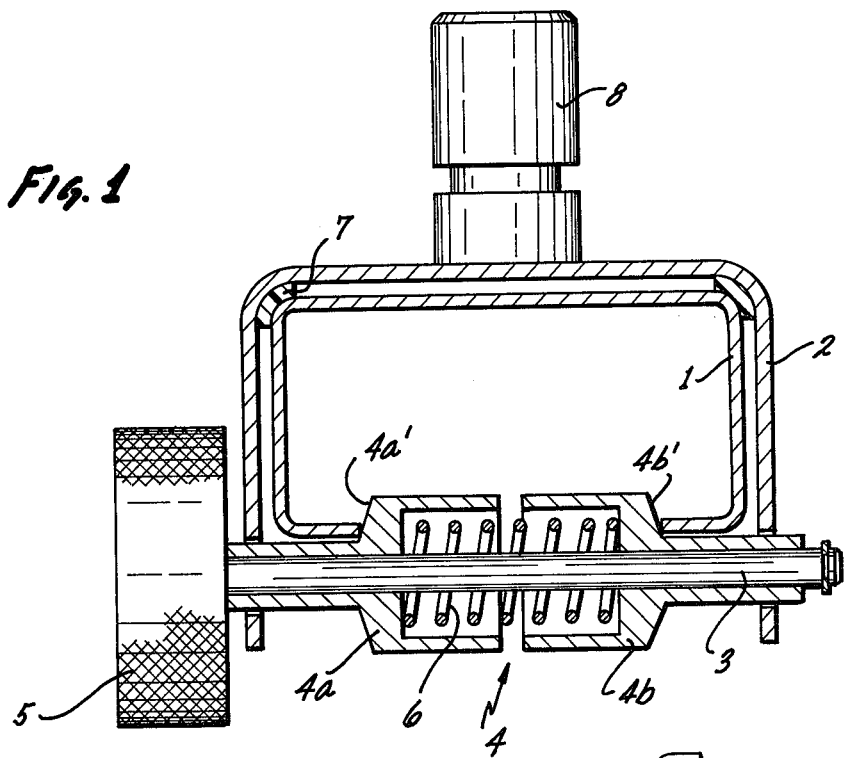
FIG. 1 is a cross-sectional view of a guiding column and friction wheel drive in accordance with the invention.

Referring now to FIG. 1, there is illustrated a guiding column 1 of C-shape. The guiding column is surrounded by a U-shape sleeve 2 so that the opening of the U of the sleeve coincides with the open side of the C-shape of the column. Between the ends of the U-shaped sleeve 2 there is journalled a shaft 3 in such a manner that it extends tangent to the guidance column along the open side of the C-shape.

Rotatably secured to the shaft 3 is a friction wheel means 4 which consists of two wheels or wheel portions 4a and 4b. The wheel portion 4a is fixedly secured to a hand wheel 5 for rotation therewith, while the wheel portion 4b is axially displaceable and rotatably mounted upon the shaft 3. The two wheel portions 4a and 4b are hollow and a helical spring 6 is disposed in the interior of the two wheel portions. The spring 6 tends to push apart the two wheel portions. The side surfaces 4a' and 4b' of the two wheel portions 4a and 4b are tapered to form conical or truncated conical surfaces.

The shaft 3 is so arranged in the U-shape sleeve that the friction wheel 4 extends into the opening of the C-shape column 1. Accordingly the surfaces 4a' and 4b' of the wheel portions 4a and 4b bear against the tip ends of the C legs of the column 1. Due to the tapered front surfaces of the wheel portions 4a and 4b the friction wheel tends under the influence of the spring 6 to move out of the C-shaped column so that the sleeve 2 is pulled against the guiding column 1. Within the corners of the U-shaped sleeve 2 there are disposed friction-reducing sliding elements 7 which are preferably made of a synthetic material. By means of the elements 7 the sleeve 2 presses against the guiding column 1 under the action of the spring 6 and under the action of the friction wheel 4 which due to its inclined surfaces tends to move outwardly. These friction-reducing elements in combination with the conical surfaces of the wheel portions 4a and 4b promote automatic centering of the sleeve 2 at the guiding column 1.

Figure 2:
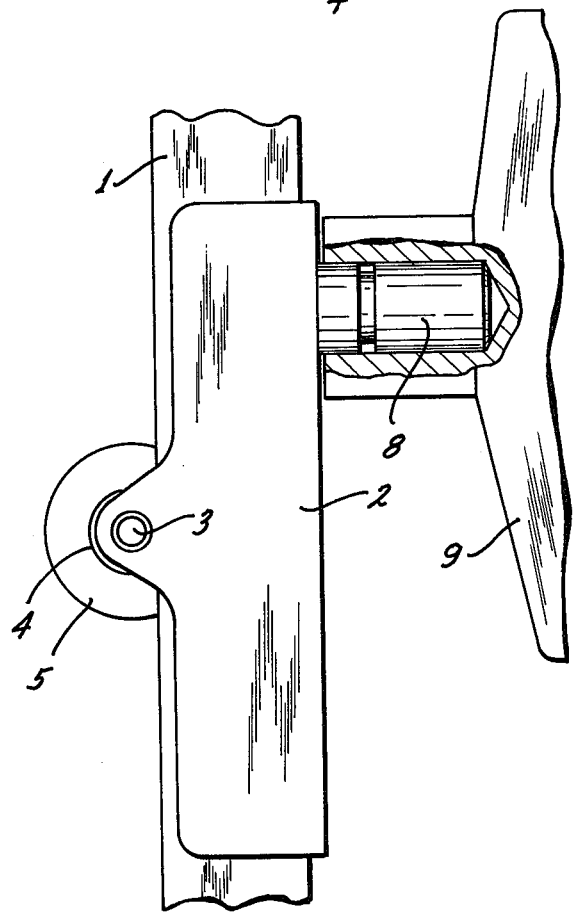
FIG. 2 is a side elevational view of the apparatus of FIG. 1.

At the sleeve 2 there is secured a bearing pivot 8 upon which the projection head 9 (see FIG. 2) is disposed so that it can be inserted and locked.

Figure 3:
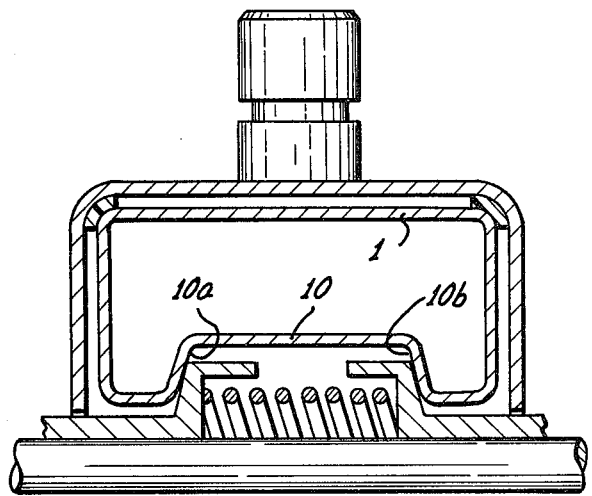
FIG. 3 is a cross-sectional view of a modified embodiment of the present invention.

In the embodiment of FIG. 3, the guiding column has a different profile. Here the groove is not formed by the opening of a C-shaped column. In order to increase the solidity of the column it has a closed surface which forms a groove 10 in the region of the friction wheel. The lateral surface or flanks 10a and 10b of the groove are slightly inclined. Otherwise, the construction of the adjustment device is identical with that of FIGS. 1 and 2.

Figure 4:
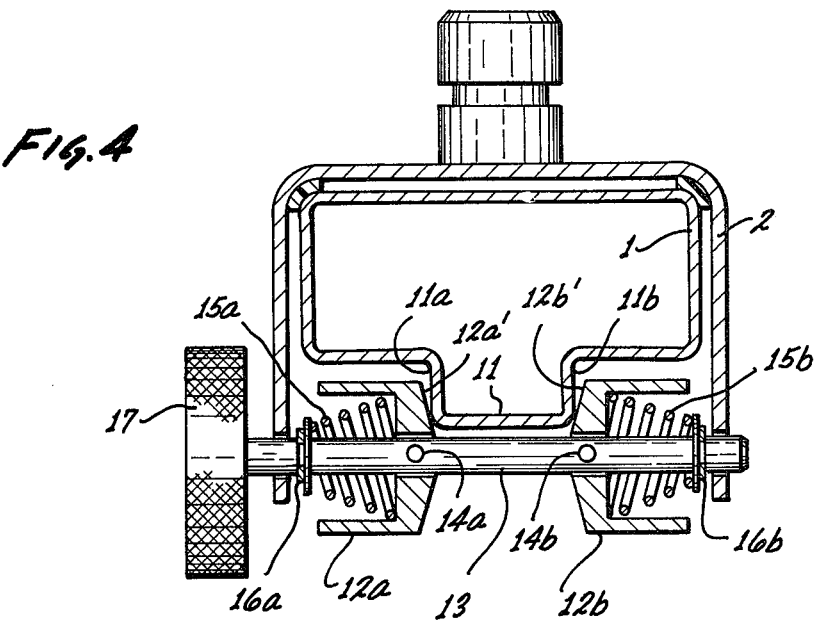
FIG. 4 is a cross-sectional view of still another embodiment of the guiding column and friction wheel drive in accordance with the invention.

FIG. 4 illustrates a variation or different embodiment of the adjustment device; here the guiding column 1 includes a shoulder portion 11 which extends from the guiding column into the region between the wheel portions 12a and 12b. The wheel portions 12a and 12b bear against the lateral surfaces 11a and 11b respectively of the portion 11. Each wheel portion is axially displaceable upon the friction wheel shaft 13 and is connected therewith by pins 14a and 14b to rotate therewith. Two helical springs 15a and 15b surround the shaft and bear on the one hand upon stops 16a and 16b respectively fixedly secured to the friction wheel shaft 13 and on the other hand against the wheel portions 12a and 12b. Thereby the springs press the lateral surfaces 12a' and 12b' of the wheel portions against the lateral surfaces 11a and 11b of the shoulder portion 11. The lateral surfaces of the wheel portions and the lateral surfaces of the shoulder portion 11 form an acute angle with each other. Accordingly, as in the embodiment of FIG. 1, the wheel portions tend to move away from the guiding column so that the sleeve is lightly pressed against the guiding column. The friction wheel shaft 13, rotatably mounted in the sleeve 2, is rigidly connected with the hand wheel 17.

The invention is not limited to the embodiments described above, but all changes and modifications thereof not constituting departures from the spirit and scope of the invention are intended to be included.

What is claimed is:

1. Device for displacing a body along a guiding column particularly suitable for the projection head of an enlarging or reproducing apparatus, said device comprising:
   a. a guiding column including a pair of guiding surfaces extending along the column;
   b. a sleeve substantially surrounding said guiding column, having an opening located over said pair of guiding surfaces;
   c. a shaft mounted on said sleeve across said opening with its axis of rotation extending tangent to said guiding column in a plane perpendicular to the direction of extension of said guiding column;
   d. a pair of friction wheels disposed on said shaft, at least one thereof being axially moveable on the shaft and extending through the opening in said sleeve to roll along said guiding column, each wheel having a lateral surface normally respectively held in rolling contact with a guiding surface of said pair; said guiding surface and said lateral surface forming an acute angle with each other; and,
   e. means for exerting axial forces on said wheels of the pair to force their lateral surfaces against the guiding surfaces of said guiding column, whereby said shaft is wedged outwardly from said column pulling said sleeve more tightly around said column.

2. Device as defined in claim 1 wherein said guiding surfaces are formed by the lateral flanks of a longitudinal groove extending in said column.

3. Device as defined in claim 2 wherein said means for exerting force consists of a spring tending to press said wheels apart in the direction of their axis of rotation.

4. Device as defined in claim 3 wherein said spring is arranged as a helical spring, said friction wheels together defining a hollow space, said spring being coaxially disposed in the hollow space of said friction wheel.

5. Device as defined in claim 3 wherein a hand wheel is secured to said friction wheel for rotation therewith.

6. Device as defined in claim 5 wherein said hand wheel is rotatably connected with one of said wheels while the other one of said wheel portions is rotatably and axially movably mounted upon said shaft.

7. Device as defined in claim 2 wherein said guiding surfaces and said shaft for the friction wheel form an acute angle with each other.

8. Device as defined in claim 2 wherein the tapered lateral surfaces of said wheels form cones or truncated cones.

9. Device as defined in claim 7 wherein said guiding column is generally C-shaped and wherein said guiding surfaces are the tip ends of the C-shaped guiding column.

10. Device as defined in claim 1 wherein said column is provided with a shoulder portion extending between said two wheels, said shoulder portion having lateral flanks against which said wheel portions bear with their tapered lateral surfaces.

11. Device as defined in claim 10 wherein a spring is associated with each of said wheels, said springs extending coaxially about the axis of said friction wheel, each of said springs bearing, on the one hand, upon one of said wheel portions and, on the other hand, upon a stop fixed upon the axis of said friction wheel.

12. Device as defined in claim 1 wherein the inner surface of said sleeve is provided with friction-reducing elements through which said sleeve presses against said column.

* * * * *

UNITED STATES PATENT AND TRADEMARK OFFICE
CERTIFICATE OF CORRECTION

PATENT NO. : 4,097,144
DATED : June 27, 1978
INVENTOR(S) : Claus Prochnow

It is certified that error appears in the above-identified patent and that said Letters Patent are hereby corrected as shown below:

[75] Claus Prochnow, Braunschweig, Fed.Republic of Germany

[73] Rollei-Werke Franke & Heidecke Braunschweig, Fed. Republic of Germany

Signed and Sealed this

Second Day of January 1979

[SEAL]

Attest:

RUTH C. MASON
*Attesting Officer*

DONALD W. BANNER
*Commissioner of Patents and Trademarks*